(12) United States Patent
Choi (10) Patent No.: US 11,395,561 B2
(45) Date of Patent: Jul. 26, 2022

(54) ELECTRIC GRILL COMPRISING PURIFICATION AND CIRCULATION SYSTEM FOR REMOVING OIL MIST AND SMOKE

(71) Applicant: DAWON E & A CO., LTD., Seoul (KR)

(72) Inventor: Seong-Hyuk Choi, Seoul (KR)

(73) Assignee: DAWON E & A CO., LTD., Seoul (KR)

( * ) Notice: Subject to any disclaimer, the term of this patent is extended or adjusted under 35 U.S.C. 154(b) by 498 days.

(21) Appl. No.: 16/490,893

(22) PCT Filed: Mar. 2, 2018

(86) PCT No.: PCT/KR2018/002527
§ 371 (c)(1),
(2) Date: Sep. 4, 2019

(87) PCT Pub. No.: WO2018/164419
PCT Pub. Date: Sep. 13, 2018

(65) Prior Publication Data
US 2020/0008621 A1    Jan. 9, 2020

(30) Foreign Application Priority Data

Mar. 9, 2017  (KR) ........................ 10-2017-0029998

(51) Int. Cl.
*A47J 37/07*    (2006.01)
*A47J 37/06*    (2006.01)
(Continued)

(52) U.S. Cl.
CPC ....... *A47J 37/0786* (2013.01); *A47J 37/0694* (2013.01); *B01D 46/0035* (2013.01);
(Continued)

(58) Field of Classification Search
None
See application file for complete search history.

(56) References Cited

FOREIGN PATENT DOCUMENTS

| JP | 11-018957 A | 1/1999 |
| JP | 2001-275846 A | 10/2001 |

(Continued)

OTHER PUBLICATIONS

PCT International Search Report PCT/KR2018/002527, dated Jun. 26, 2018.
PCT Written Opinion PCT/KR2018/002527, dated Jun. 26, 2018.

*Primary Examiner* — Christopher P Jones
*Assistant Examiner* — Phillip Y Shao (57) ABSTRACT

The present invention relates to an electric grill comprising a purification and circulation system for removing oil mist and smoke and, more particularly, to an electric grill comprising a purification and circulation system for removing oil mist and smoke, wherein: a suction hole and a discharge hole are installed around a grill plate; air containing oil mist, smoke, heat, and smell is suctioned through the suction hole, the suctioned air containing, oil mist, smoke, heat, and smell is introduced into the lower portion of the grill by a suction fan, and comes into contact with water on the upper side of an oil pan containing the water, so as to remove the oil mist, smoke, heat, and smell contained therein, and then the purified air is circulated through the discharge hole installed around the grill plate; a filter is disposed so as to completely remove the oil mist, smoke, heat, and smell; and a Coanda air guide is installed so as to facilitate the contact between the oil mist, smoke, heat, and smell and the water, whereby the oil mist, smoke, heat, and smell can be completely removed.

4 Claims, 9 Drawing Sheets

(51) Int. Cl.
*B01D 46/00* (2022.01)
*B01D 46/24* (2006.01)
*B01D 47/02* (2006.01)
*B01D 50/60* (2022.01)

(52) U.S. Cl.
CPC .......... *B01D 46/2411* (2013.01); *B01D 47/02* (2013.01); *B01D 50/60* (2022.01)

(56) References Cited

FOREIGN PATENT DOCUMENTS

| | | |
|---|---|---|
| KR | 20-0138631 Y1 | 3/1999 |
| KR | 10-0378679 B1 | 4/2003 |
| KR | 10-0464922 B1 | 1/2005 |
| KR | 10-0743347 B1 | 7/2007 |
| KR | 10-0760790 B1 | 10/2007 |
| KR | 10-0794911 B1 | 1/2008 |
| KR | 10-1680521 B1 | 12/2016 |

ELECTRIC GRILL COMPRISING PURIFICATION AND CIRCULATION SYSTEM FOR REMOVING OIL MIST AND SMOKE

CROSS-REFERENCE TO RELATED APPLICATION

This application is the National Stage of International Application No. PCT/KR2018/002527, filed on Mar. 2, 2018, which claims the benefit of and priority to Korean Patent Application No. 10-2017-002998 filed on Mar. 9, 2017, which are herein incorporated by reference in is entirety.

TECHNICAL FIELD

The present invention relates to an electric grill having an oil mist and smoke purification and circulation system, and more specifically, to an electric grill having an oil mist and smoke purification and circulation system in which a suction hole and a discharge hole are installed in a periphery of one side of a grill plate and thus oil mist and smoke are suctioned into the suction hole, a filter is provided in the electric grill to discharge and circulate air to the discharge hole installed in the periphery of the other side of the grill plate and completely remove the oil mist after the oil mist and smoke which are suctioned are introduced into a lower portion of the grill plate by a suction fan, and then the oil mist and smoke are brought into contact with water at an upper side of an oil pan, in which water is filled, to purify the oil mist and smoke, and a Coanda guide plate is installed so that the oil mist and smoke smoothly come into contact with the water to completely remove the oil mist and smoke.

TECHNICAL BACKGROUND

Generally, a home, a restaurant, or the like is provided with an electric grill formed of a grill in which a plurality of introduction holes are formed, and an oil pan provided under the grill to receive oil which drops from the introduction holes.

In the conventional electric grill, oil generated when meat is roasted is introduced into the lower oil pan through the introduction holes of the grill, but a relatively large amount of oil is splashed to the outside to pollute the surroundings of the electric grill, and a smell or smoke generated when the meat is roasted is diffused to an indoor space to pollute indoor air, and since the heat of the grill is dissipated to the indoor space when the meat is roasted, a time for roasting the meat is prolonged and thus power consumption is increased.

To this end, conventionally, an electric grill in which a suction fan and a motor configured to drive the suction fan are installed, and a plurality of suction holes are formed in a body of a periphery of the grill so that the oil, smell, or smoke generated when the meat is roasted is suctioned into the body through the suction holes in the periphery of the grill and then blown to the oil pan under the body, was developed.

According to the related patent art, in Korean Patent Registration No. 10-0464922 (Dec. 24, 2004), there is provided an electric grill further including a lower case 2; a drawer 3 installed at one inner side of the lower case 2 to be slidable and in which water is stored; a suction fan 5 provided at a center of a lower portion of the lower case 2 and configured to suction air including oil, smoke, and heat and blow the air into the drawer 3; a middle cover 6 coupled to an upper end of the lower case 2; an upper case 8 coupled onto the middle cover 6; an oil pan 9 provided at an upper periphery of the upper case 8; a grill 12 seated on the oil pan 9; a hollow-shaped suction pipe 17 in which lower end thereof is connected to a suction line of the suction fan 5, an upper end thereof protrudes upward from a center of the grill 12, and a plurality of suction ports 18 are formed in a periphery of the protruding portion; a fixture 19 of which a lower end is fixedly supported on an upper end of the suction pipe 17; a meat lifting plate 20 coupled to an upper end of the fixture 19 and on which an appropriately done meat is placed.

However, in the patent, although oil mist and smoke generated from a center portion of the grill are suctioned into the center portion as a suction port is formed in the center portion, oil mist and smoke generated from a surrounding portion are discharged to the outside, and oil is accumulated in the oil pan 9 and pollutes the oil pan 9 and thus there is a burden of separating and separately washing the oil pan.

Further, in an air circulation structure of an electric roaster in Korean Patent Registration No. 10-0743347 (Jul. 20, 2007), an air circulation system of a roaster is provided, which includes: a first air flow space 10 formed in a double-plate structure formed on a side surface of a roaster 100 and a second air flow space 20 having a double-plate structure in which an air introduction hole is formed; an elongated-shaped fan 30 which is disposed in a fan bracket 33 having an introduction hole 31 and a discharge hole 32 at a lower end of the second air flow space 20; a rotating motor 40 of which a shaft is fixed to a shaft of the fan 30 at one side divided with the fan bracket 33; a grill plate seating plate 50 configured to be bent in the roaster 100; an electric heater 60 fixed to a support fixture 51 installed on an inner circumferential surface of the seating plate 50; and a grill plate 70 in which a plurality of oil discharge holes 71 are formed and an insertion groove 77 is formed so that the electric heater 60 is attached and detached, wherein the air circulation system has a hot-air oxidation cycle in which air introduced into the second air flow space 20 through the air introduction hole due to rotation of the fan 30 passes through the discharge hole 32 after passing through the introduction hole 31 of the fan bracket 33 and is introduced into an inner space 80 of the roaster 100, and the introduced air is discharged to the plurality of oil discharge holes 71 of the grill plate 70 and circulated to the second air flow space 20 again through the air introduction hole 21 by the fan.

However, in the patent, although oil discharge holes are formed throughout an entire grill plate and thus the oil directly drops on the oil pan to minimize pollution, since circulating oil mist and smoke are introduced into a lower portion of the grill plate by the fan, and then are directly diffused upward through the oil discharge holes of the grill plate, circulation and purification are insufficient.

Further, in Korean Patent Registration No. 10-0794911 (Jan. 8, 2008), an air circulation and injection structure of an electric frying pan is provided, which includes a lower case in which an oil pan is provided, an upper case seated on, the lower case, a suction fan configured to suction air from the inside of the lower case, a motor configured to rotate the suction fan, an exhaust dispersion guide plate seated on the upper case, a heating body, located on the exhaust dispersion guide plate, and a grill plate seated on the heating body, wherein a plurality of circular dispersion discharge holes 22c and quadrangular dispersion discharge holes 32c are formed in centers of the exhaust dispersion guide plates 22 and 32 so that air suctioned by the suction fan 14 and filtered by water stored in the oil pan 13 is dispersedly discharged to an end portion of the grill plate 21.

However, in the patent, since only oil mist and smoke generated in an upper portion of the grill plate are circulated, and a discharge hole through which oil is discharged is not formed in the grill plate 21, all the oil on the grill plate should be removed manually after being used, and the oil pan provided under the grill plate 21 is useless.

Further, in Korean Patent Registration No. 10-0378679 (Mar. 21, 2003), an electric grill provided with a grill plate on which ingredients are laid, and an oil pan under the grill plate, is provided, which includes: a body A 2 in which an introduction space portion 3 is formed therein, a seating chamber 4 having an opened upper portion is formed in a center portion thereof to form a plurality of suction holes 5 configured to communicate with the introduction space portion 3 in an upper inner circumferential surface, and an oil exhaust port 6 is formed to pass through a lower surface of the seating chamber 4; a body B 2' in which an introduction space portion 3' is formed therein, detachably coupled to a lower surface of the body A 2 to have an inner part which communicates with the oil exhaust port 6, and having a suction fan 10 configured to communicate with the introduction space portion 3 of the body A 2 installed at one side of the introduction space portion 3'; a support 11 having a discharge hole A 12 formed at a lower surface thereof and a plurality of smoke introduction holes 13 formed in a periphery of an outer circumferential surface thereof to be provided in the seating chamber 4 of the body A 2; the grill plate 14 having a V-shaped side cross-sectional surface to be seated on an upper end of the support 11 in a replaceable manner, and having a discharge hole B 15 formed in a center portion thereof and a plurality of vent holes 16 firmed in a surface thereof to be heated according to power supply; a sensing sensor 24 provided at a lower surface of the grill plate 14 to sense a temperature of the grill plate 14 and control the operation of the suction fan 10; and the oil pan 1 having an accommodation space portion 23 formed therein and provided in a lower end of the body B 2' to be withdrawable to the outside.

However, in the patent, although only oil mist and smoke are suctioned into a surrounding portion due to the presence of suction holes in the periphery of the grill plate, since the oil mist and smoke which are circulated are introduced into a lower portion of the grill plate by the suction fan, and then immediately diffused in an upward direction through the oil discharge holes of the grill plate circulation and purification are insufficient.

Accordingly, in order to solve the problems of the conventional patents, the inventors developed an electric grill having an oil mist and smoke purification and circulation system in which a suction hole is installed in a periphery of a grill plate to suction oil mist and smoke through the suction hole, an oil mist filter is provided in a lower portion of the electric grill to circulate air to a discharge hole installed in the periphery of the grill plate and completely remove the oil mist after the oil mist and smoke which are circulated are introduced into a lower portion of the grill plate by a suction fan, and then the oil mist and smoke are brought into contact with water at an upper side of an oil pan, in which water is filled, to purify the oil mist and smoke, and a Comb guide plate is installed so that the oil mist and smoke smoothly come into contact with the water and thus can be completely removed, and thus the present invention has been completed.

DETAILED DESCRIPTION

Problems to be Solved

The present invention is directed to providing an electric grill having an oil mist and smoke purification and circulation system in which a suction hole and a discharge hole are installed in a periphery of a grill plate so that oil mist, smoke, heat, and a smell are suctioned through the suction hole, a filter is provided to circulate air to the discharge hole installed in the periphery of the grill plate and completely remove the oil mist, smoke, heat, and smell after the oil mist, smoke, heat, and smell which are circulated are introduced into a lower portion of the grill plate by a suction fan, and then the oil mist, smoke, heat, and smell are brought into contact with water at an upper side of an oil pan, in which water is filled, to be removed, and a Coanda air guide is installed so that the oil mist, smoke, heat, and smell smoothly come into contact with the water and become completely removable.

Solution to Solve the Problem

One aspect of the present invention provides an electric grill having an oil mist and smoke purification and circulation system, including: a grill main body; an oil pan installed at one inner side of a lower portion of the grill main body to be slidable and in which water is stored; a suction fan provided at one side of the oil pan and configured to suction air including oil mist, smoke, heat, and a smell and blow the air to the water stored in the oil pan, a heat dissipation plate spaced apart in an upward direction from the oil pan and the suction fan to be coupled, spaced apart from inner side wall portions of both sides of the grill main body to be coupled to the inner side wall portions, and provided with a plurality of suction holes and discharge holes formed in upper portions of both side ends of an upper portion of a periphery of a grill plate in a longitudinal direction at intervals; a heater support installed to be spaced apart from an upper portion of the heat dissipation plate; a heater seated on the heater support; and the grill plate in which a seating groove of the heater is formed in a lower portion thereof, and a side cross-sectional surface has a V shape to be seated on the heater.

First oil discharge ports may be formed in the grill plate along a central-longitudinal direction at a predetermined interval to protrude from and pass through a lower portion of the grill plate, and second oil discharge ports may be formed in the heat dissipation plate along a central-longitudinal direction at a predetermined interval to protrude from and pass through an upper portion of the heat dissipation plate so that the first oil discharge ports may be correspondingly inserted thereinto, and thus the oil may be discharged through the first oil discharge ports and the second oil discharge ports, thereby preventing pollution of the heat dissipation plate due to the oil.

The air suctioned by the suction fan may be circulated in one direction through the plurality of suction holes of the heat dissipation plate and the space formed by the heat dissipation plate and both inner side wall portions of the grill main body which are spaced apart from each other, and the air including the oil mist, smoke, heat, and smell generated on the grill plate may be suctioned by the suction fan and introduced through the plurality of suction holes at one side of the heat dissipation plate and the space formed by one side of the heat dissipation plate and inner side wall portions at one side of the grill main body which are spaced apart from each other, and may come into contact with the water stored in the oil pan to remove the oil mist, smoke, heat, and smell, and then may be circulated through a space formed by the other side of the heat dissipation plate and an inner side wall portion at the other side of the grill main body which are spaced apart from each other and a plurality of discharge holes at the other side of the heat dissipation plate.

A detachable filter cartridge coupled in a longitudinal direction may be installed in a space finned by the heat dissipation plate and both inner side wall portions of the grill main body which are spaced apart from each other, to additionally remove the oil mist, smoke, heat, and smell of the air which are circulated.

A Coanda air guide configured to guide the oil mist, smoke, heat, and smell, which are suctioned, so that the oil mist, smoke, heat, and smell come into contact with the water stored in the oil pan may be installed between the oil pan and the suction fan, and the Coanda air guide may include a guide main body part, a Coanda curve part, and a Coanda nozzle so that the air including the oil mist, smoke, heat, and smell blown by the suction fan may flow in a downward direction to the water stored in the oil pan through the Coanda nozzle due to a Coanda effect and thus the contact between the air and the water may increase.

Further, an oil fence spaced apart from a right side of the suction fan in an upward direction to be coupled and coupled to a right inner side wall portion of the grill main body may be provided between the suction fan and the right inner side wall portion of the grill main body to prevent pollution of the right inner side wall portion of the grill main body from oil generated as the oil mist in the air which passes through the plurality of suction holes is condensed.

The oil fence may include an oil fence liner coupled in close contact with the right inner side wall portion of the grill main body; and an oil pooling part formed in an U-shaped cross-sectional shape in a direction toward the suction fan from a lower portion of the oil fence liner to collect and remove oil which flows through the oil fence liner.

Further, the Coanda air guide and the suction fan may be configured to be insertable and separable at an upper end of the electric grill to be replaceable in a case of washing, a breakdown, or wear after being used.

Advantages of Invention

In an electric grill of the present invention having an oil mist and smoke purification and circulation system, a suction hole and a discharge hole are installed in a periphery of a grill plate and thus air including oil mist, smoke, heat, and a smell are suctioned through the suction hole, a filter is provided to circulate air to the discharge hole installed in a periphery of the grill plate and completely remove the oil mist, smoke, heat, and smell after the air including the oil mist, smoke, heat, and smell which are suctioned is introduced into a lower portion of the grill plate by a suction fan, and then the oil mist, smoke, heat, and smell are brought into contact with water at an upper side of an oil pan, in which water is filled, to be removed, and a Coanda air guide is installed so that the oil mist, smoke, heat, and smell smoothly come into contact with the water, thereby completely removing the oil mist, smoke, heat, and smell.

Further, in the electric grill of the present invention having an oil mist and smoke purification and circulation system, since a grill plate, a heat dissipation plate, a heater, an oil pan, a Coanda air guide, an oil fence, a suction fan, a filter cartridge are configured to be easily detachable, each component can be cleaned after use, and since components can be replaced in a case of a breakdown or wear, a lifespan of the device can be maintained for a long time.

REFERENCE NUMERALS

| | | |
|---|---|---|
| 100: grill main body | 101: grill plate | 108: oil pan |
| 111: suction fan | 102: suction hole | 120: discharge hole |
| 130: heat dissipation plate | 106: heater support | |
| 105: heater | 107: seating groove | |
| 200: oil fence | 201: oil fence liner | 202: oil pooling part |

MODES OF THE INVENTION

The present invention discloses an electric grill having an oil mist and smoke purification and circulation system, including: a grill main body; an oil pan installed at one inner side of a lower portion of the grill main body to be slidable and in which water is stored; a suction fan provided at one side of the oil pan and configured to suction air including oil mist, smoke, heat, and a smell to blow the air to the water stored in the oil pan; a heat dissipation plate spaced apart in an upward direction from the oil pan and the suction fan to be coupled, spaced apart from inner side wall portions of both sides of the grill main body to be coupled to the inner side wall portions, and provided with a plurality of suction holes and discharge holes formed in upper portions of both side ends of an upper portion of a periphery of a grill plate in a longitudinal direction at intervals; a heater support installed to be spaced apart from an upper portion of the heat dissipation plate; a heater seated on the heater support; and the grill plate in which a seating groove of the heater is formed in a lower portion thereof, and a side cross-sectional surface has a V shape to be seated on the heater.

In the technical configuration, first oil discharge ports are formed in the grill plate along a central-longitudinal direction at a predetermined interval to protrude from and pass through a lower portion of the grill plate, and second oil discharge ports are formed in the heat dissipation plate along a central-longitudinal direction at a predetermined interval to protrude from and pass through an upper portion of the heat dissipation plate so that the first oil discharge ports are correspondingly inserted thereinto, and thus the oil is discharged through the first oil discharge ports and the second oil discharge ports, thereby preventing pollution of the heat dissipation plate due to the oil.

In the technical configuration, the air suctioned by the suction fan is circulated in one direction through the plurality of suction holes of the heat dissipation plate and a space formed by the heat dissipation plate and both inner side wall portions of the grill main body which are spaced apart from each other, and the air including the oil mist, smoke, heat, and smell generated on the grill plate suctioned is by the suction fan and introduced through the plurality of suction holes at one side of the heat dissipation plate and the space formed by one side of the heat dissipation plate and inner side wall portions at one side of the grill main body which are spaced apart from each other, and comes into contact with the water stored in the oil pan to remove the oil mist, smoke, heat, and smell, and then is circulated through a space formed by the other side of the heat dissipation plate and an inner side wall portion at the other side of the grill main body which are spaced apart from each other and a plurality, of discharge holes at the other side of the heat dissipation plate.

In the technical configuration, a detachable filter cartridge coupled in a longitudinal direction is installed in a space formed by the heat dissipation plate and both inner side wall portions of the grill main body which are spaced apart from each other, to additionally remove the oil mist, smoke, heat, and smell of the air which are circulated.

In the technical configuration, a Coanda air guide configured to guide the air including the oil mist, smoke, heat, and smell, which are suctioned, so that the air comes into contact with the water stored in the oil pan is installed between the oil pan and the suction fan, and the Coanda air guide includes a guide main body part, a Coanda curve pan, and a Coanda nozzle so that the air including the oil mist, smoke, heat, and smell blown by the suction fan flows in a downward direction to the water stored in the oil pan through the Coanda nozzle due to a Coanda effect and thus the contact between the air and the water increases.

Further, in the technical configuration, an oil fence spaced apart from a right side of the suction fan in an upward direction to be coupled and coupled to a right inner side wall portion of the grill main body is provided between the suction fan and the right inner side wall portion of the grill main body to prevent pollution of the right inner side wall portion of the grill main body from oil generated as the oil mist in the air which passes through the plurality of suction holes is condensed.

In the technical configuration, the oil fence includes an oil fence liner coupled in close contact with the right inner side wall portion of the grill main body; and an oil pooling part funned in an U-shaped cross-sectional shape in a direction toward the suction fan from a lower portion of the oil fence liner to collect and remove oil which flows through the oil fence liner.

Further, in the technical configuration, the Coanda air guide and the suction fan are configured to be insertable and separable at an upper end of the electric grill to be replaceable in the case of washing, a breakdown, or wear after being used.

Hereinafter, embodiments of the present invention will be described in detail with reference to the preferable drawings so that those skilled in the art may easily carry out the embodiments. The present invention may be implemented in various forms and is not limited to the drawings which will be described.

First, an electric grill having an oil mist and smoke purification and circulation system of the present invention includes: a grill main body, an oil pan installed at one inner side of a lower portion of the grill main body to be slidable and in which water is stored; a suction fan provided at one side of the oil pan and configured to suction air including oil mist, smoke, heat, and a smell and blow the air to the water stored in the oil pan; a heat dissipation plate spaced apart in an upward direction from the oil pan and the suction fan to be coupled, spaced apart from inner side wall portions of both sides of the grill main body to be coupled to the inner side wall portions, and provided with a plurality of suction holes and discharge holes formed in upper portions of both side ends of an upper portion of a periphery of a grill plate in a longitudinal direction at intervals; a heater support installed to be spaced apart from an upper portion of the heat dissipation plate; a heater seated on the heater support; and the grill plate in which a seating groove of the heater is formed in a lower portion thereof, and a side cross-sectional surface has a V shape to be seated on the heater.

That is, referring to FIGS. 1 to 7, an electric grill having an oil mist and smoke purification and circulation system of the present invention includes: a grill main body 100; an oil pan 108 installed at one inner side of a lower portion of the grill main body to be slidable and in which water is stored; a suction fan 111 provided at one side of the oil pan and configured to suction air including oil mist, smoke, heat, and a smell and blow the air to the water stored in the oil pan; a heat dissipation plate 130 spaced apart in an upward direction from the oil pan 108 and the suction fan 111 to be coupled, spaced apart from inner side wall portions of both sides of the grill main body 100 to be coupled to the inner side wall portions, and provided with a plurality of suction holes 102 and discharge holes 120 formed in upper portions of both side ends of an upper portion of a periphery of a grill plate in a longitudinal direction at intervals; a heater support 106 installed to be spaced apart from an upper portion of the heat dissipation plate 130; a heater 105 seated on the heater support 106; and the grill plate 101 in which a seating groove 107 of the heater 105 is formed in a lower portion thereof, and a side cross-sectional surface has a V shape to be seated on the heater.

Figure 1:
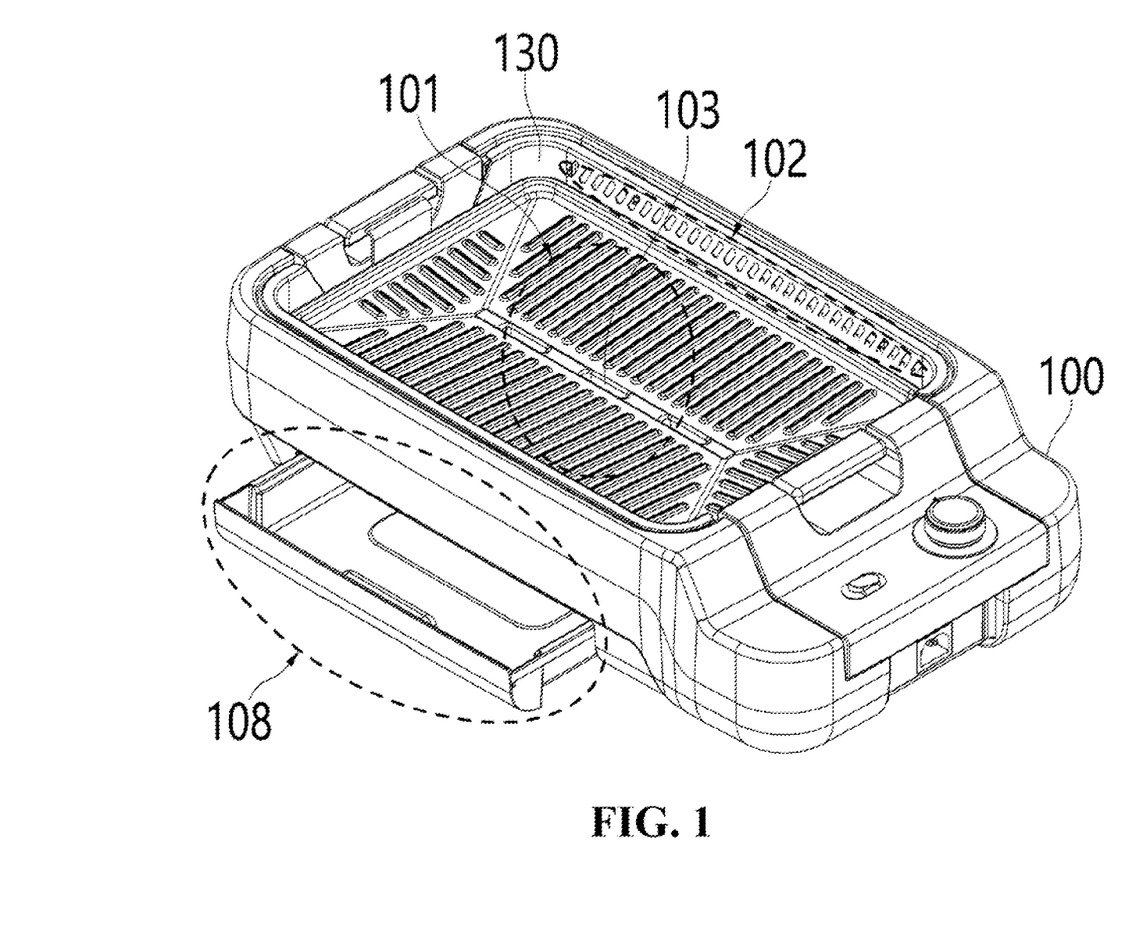
FIG. 1 is a perspective view illustrating an overall shape of a grill according to the present invention.
Figure 2:
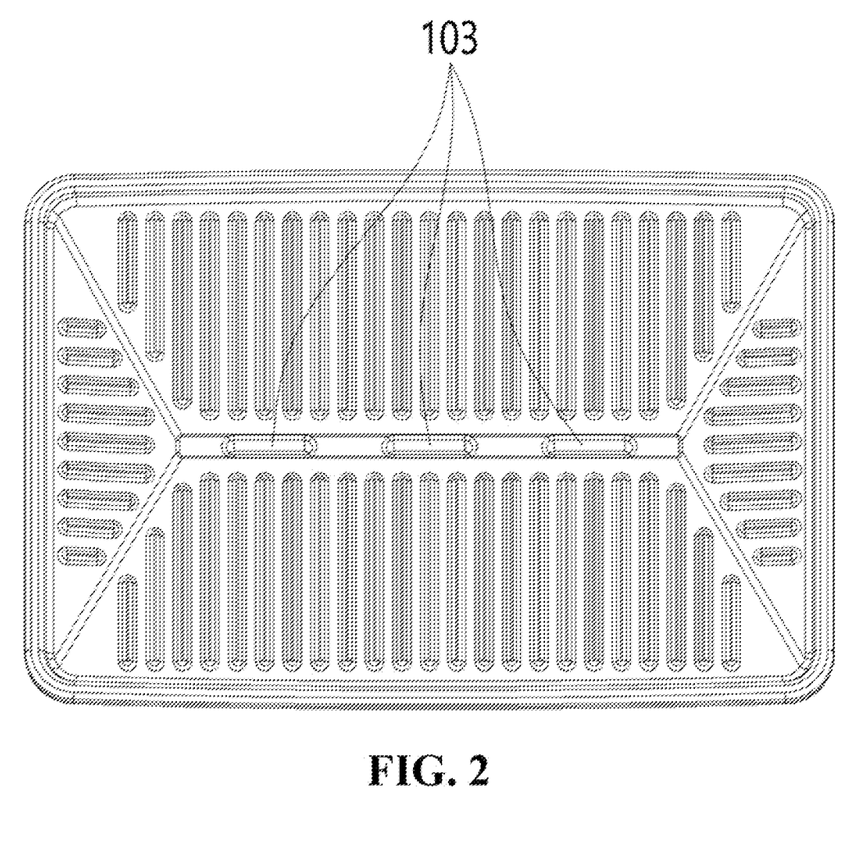
FIG. 2 is a top view illustrating an upper surface of a mill plate according to the present invention.
Figure 3:
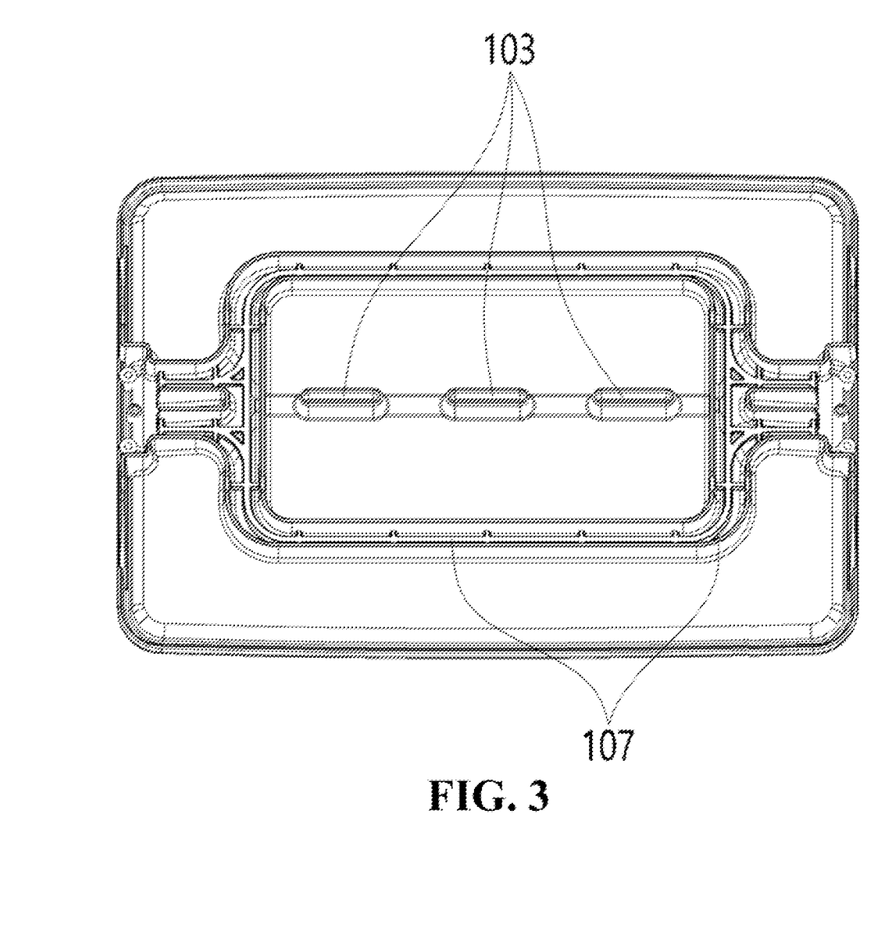
FIG. 3 is a bottom view illustrating a lower surface of the grill plate according to the present invention.
Figure 4:
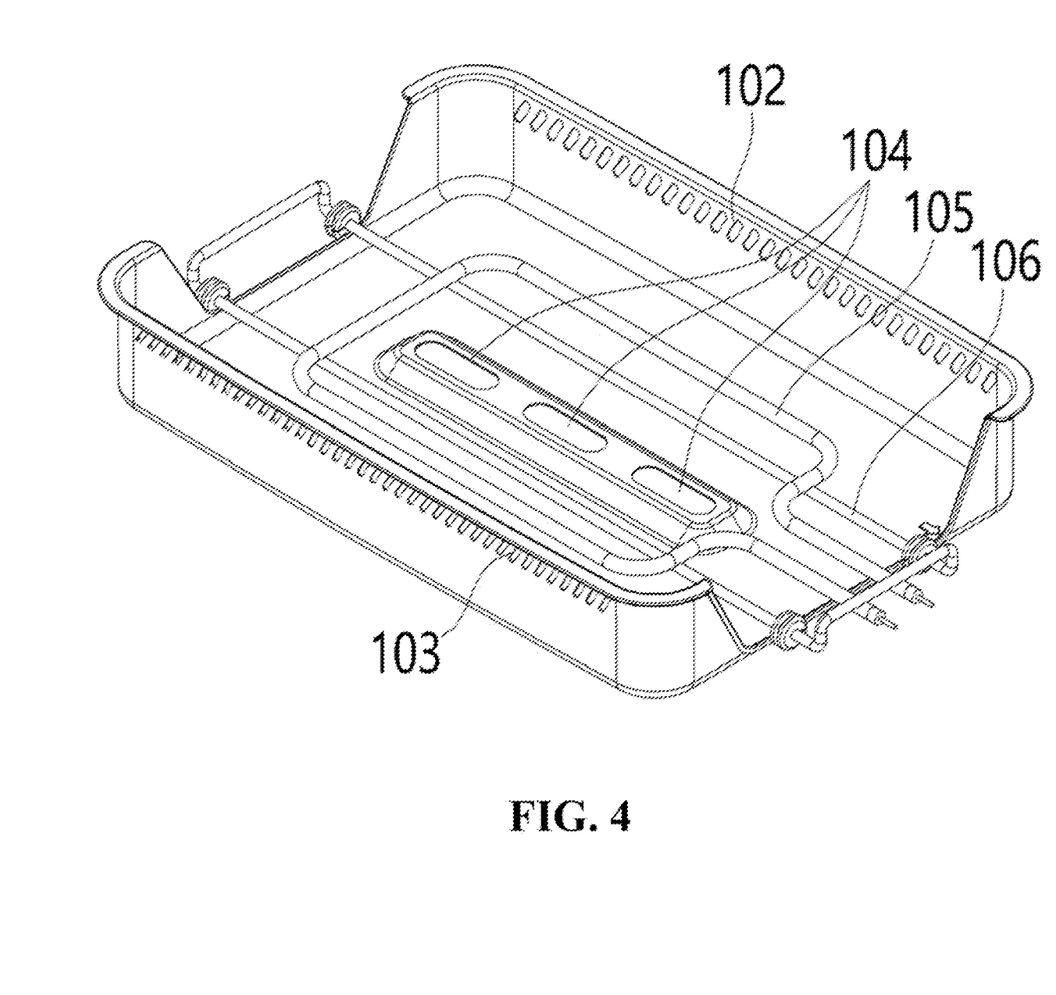
FIG. 4 is a view illustrating the coupling of a heat dissipation plate, a heater support, and a heater of the grill according to the present invention.

In this case, first oil discharge ports 103 are formed in the grill plate 101 along a central-longitudinal direction at a predetermined interval to protrude from and pass through a lower portion of the grill plate 101, and second oil discharge ports 104 are formed in the heat dissipation plate 130 along a central-longitudinal direction at a predetermined interval to protrude from and pass through an upper portion of the heat dissipation plate 130 so that the first oil discharges port 103 are correspondingly inserted thereinto, and thus the oil is discharged through the first oil discharge ports 103 and the second oil discharge ports 104, thereby preventing pollution of the heat dissipation plate due to the oil.

Figure 6:
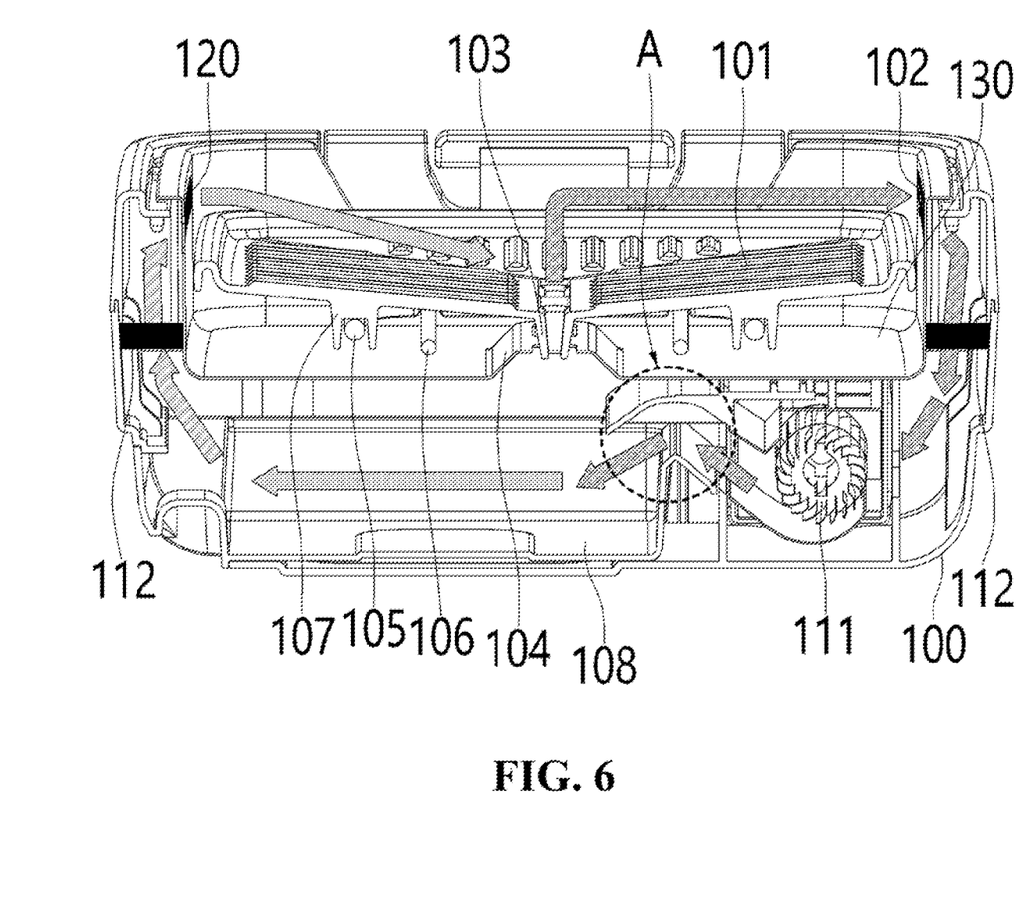
FIG. 6 is an inner cross-sectional view illustrating an inner cross-sectional surface of the grill according to the present invention.

Here, referring to FIG. 6, in a description of an air circulation structure of the present invention, the air suctioned by the suction tan is circulated in one direction through the plurality of suction holes 102 of the heat dissipation plate 130 and a space formed by the heat dissipation plate 130 and both inner side wall portions of the grill main body 100 which are spaced apart from each other, and the air including the oil mist, smoke, heat, and smell generated on the grill plate 101 is suctioned by the suction fan 111 and introduced through the plurality of suction holes 102 at one side of the heat dissipation plate 130 and the space formed by one side of the heat dissipation plate 130 and inner side wall portions at one side of the grill main body 100 which are spaced apart from each other, and comes into contact with the water stored in the oil pan 108 to remove the oil mist, smoke, heat, and smell, and then is circulated through a space formed by the other side of the heat dissipation plate 130 and an inner side wall portion at the other side of the grill main body 100 spaced apart from each other and a plurality of discharge holes 120 at the other side of the heat dissipation plate 130, thereby purifying and circulating the air including the oil mist, smoke, heat, and smell.

In this case, a detachable filter cartridge 112 coupled in a longitudinal direction may be installed in a space formed by the heat dissipation plate 130 and both inner side wall portions of the grill main body 100 which are spaced apart from each other, to completely remove the oil mist, smoke, heat, and smell.

Figure 7:
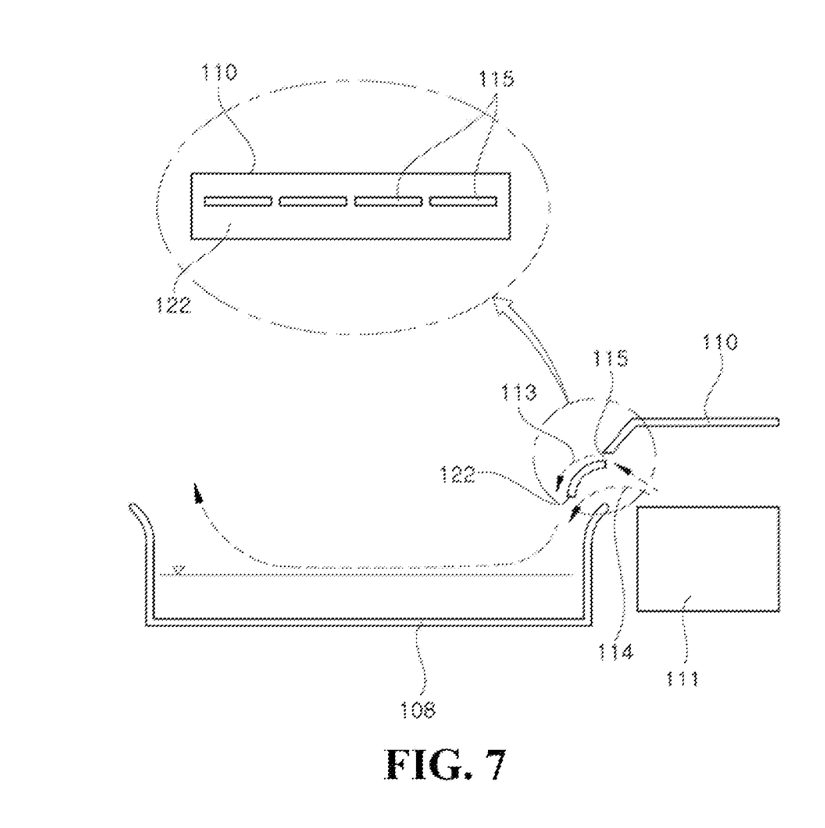
FIG. 7 is an enlarged cross-sectional view of the Coanda air guide of the grill according to the present invention.

Further, FIG. 7 is an enlarged cross-sectional view of FIG. 6A, and referring to FIG. 7, a Coanda air guide configured to guide the oil mist, smoke, heat, and smell, which are suctioned, so that the oil mist, smoke, heat, and smell come into contact with the water stored in the oil pan 108, is installed between the oil pan 108 and the suction fan 111, and the Coanda air guide includes a guide main body part 110, a Coanda curve part 122, and a Coanda nozzle 115 so that the oil mist, smoke, heat, and smell blown by the suction fan 111 flow in a downward direction to the water stored in the oil pan 108 through the Coanda nozzle due to a Coanda effect, and thus the contact between the oil mist, smoke, heat, and smell and the water increases.

In the above, the Coanda effect refers to a principle or property that changes a flowing direction of fluid so that the fluid flows in close contact with a curved surface when the fluid flows along the curved surface, and in the present invention, the air including the oil mist, smoke, heat, and smell flows through the guide main body part 110, the Coanda nozzle 115, and the Coanda curve part 122, and since a flow path of air is guided in a direction downward from the oil pan 108 using the Coanda curve part 122, the contact between the air and water increases.

That is, in the air blown from the suction fan 111, an airflow which passes through the Coanda nozzle 115 and an airflow 113 which flows along an inner surface of the Coanda air guide are formed, and in this case, since the airflow which passes through the Coanda nozzle 115 serves as an air curtain, and an airflow 114 which flows along the inner surface of the Coanda air guide is controlled in a downward direction, the contact between the air and water increases.

Figure 5:
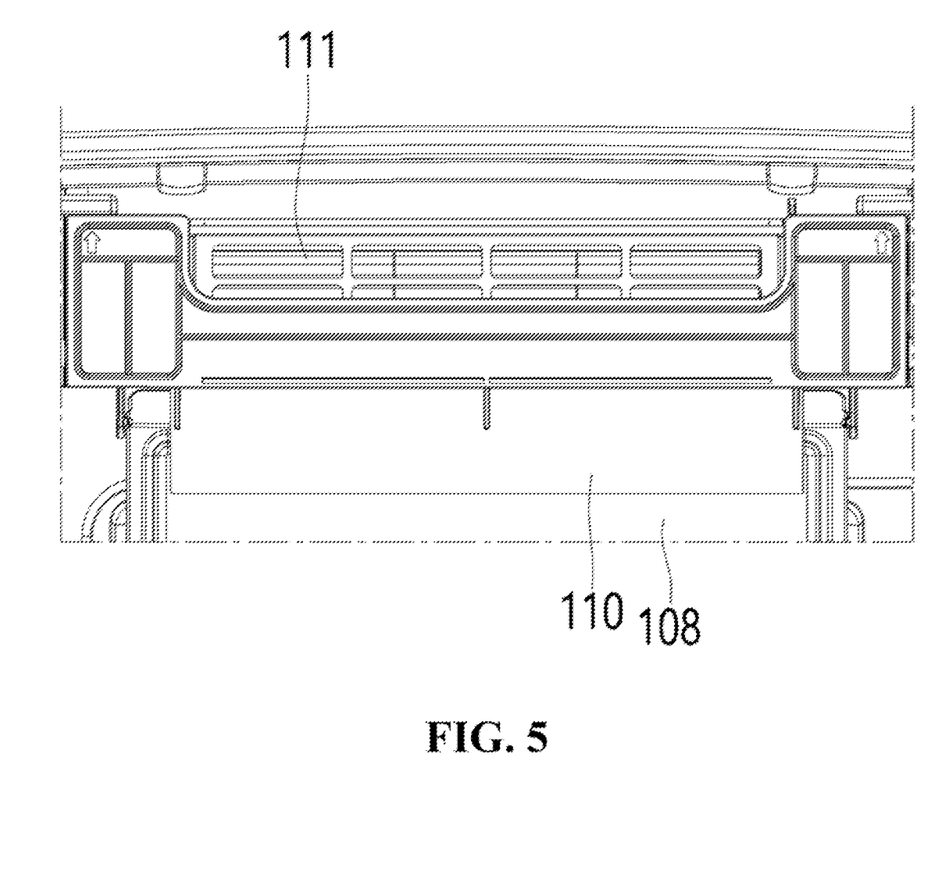
FIG. 5 is a view illustrating a suction fan and a Coanda air guide of the grill according to the present invention.

Further, referring to FIG. 5, after the electric grill guide is used, since the Coanda air guide is configured so that the guide main body part 110 and the suction fan 111 may be sequentially detached from an upper end of the Coanda air guide and washed, or may be detached to replace components even in the case of a partial breakdown or wear, a lifespan of the electric grill may be increased by maintaining cleanliness.

Figure 8:
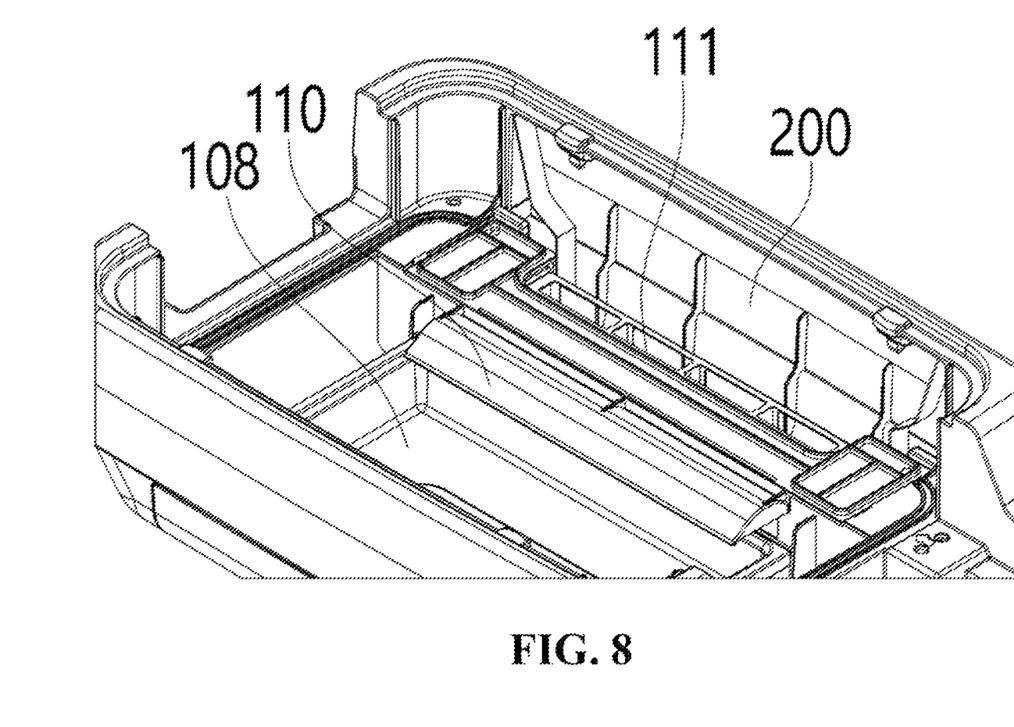
FIG. 8 is a coupling perspective, view of an oil fence of the grill of the present invention.
Figure 9:
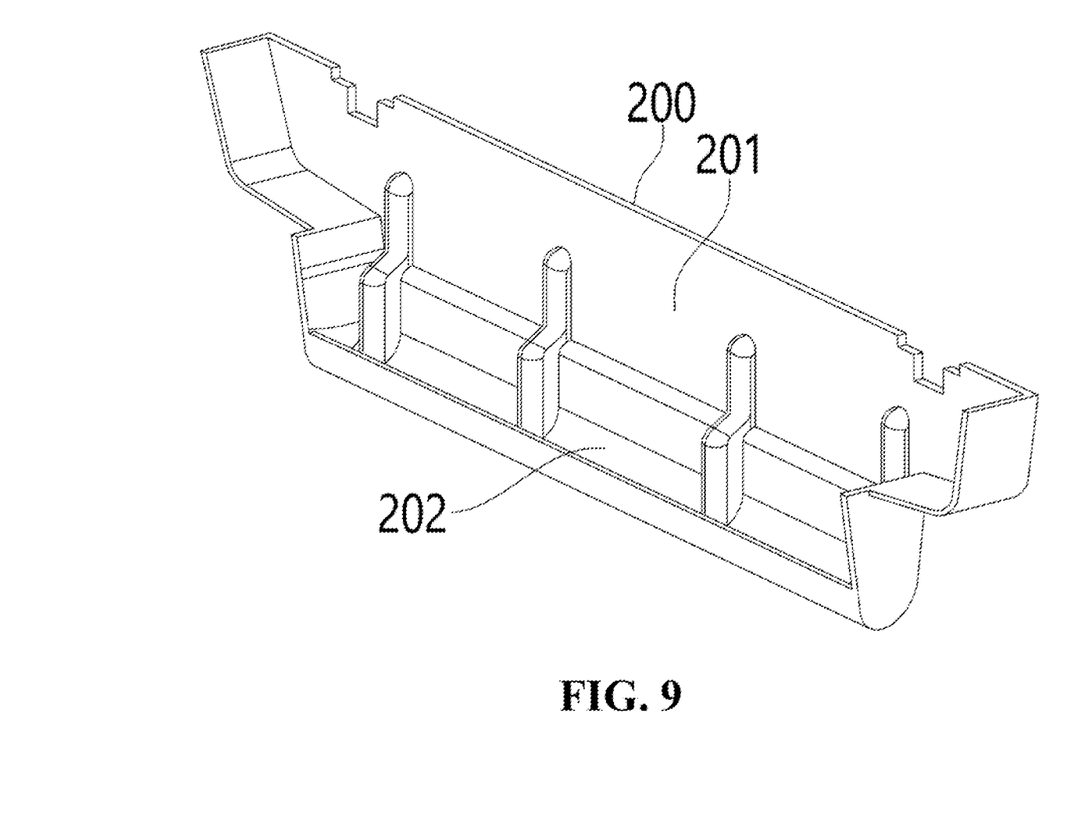
FIG. 9 is a configuration view of the oil fence of the grill of the present invention.

Meanwhile, as shown in FIGS. 8 and 9, in the electric grill having an oil mist and smoke purification and circulation system of the present invention, an oil fence 200 spaced apart from a right side of the suction fan in an upward direction to be coupled and coupled to the right inner side wall portion of the grill main body may be provided between the suction fan 111 and the right inner side wall portion of the grill main body to prevent pollution of the right inner side wall portion of the grill main body from oil generated as the oil mist in the air which passes through the plurality of suction holes 102 is condensed.

That is, the oil fence 200 may include: an oil fence liner 201 coupled in close contact with the right inner side wall portion of the grill main body; and an oil pooling part 202 formed in an U-shaped cross-sectional shape in a direction toward the suction fan 111 from a lower portion of the oil fence liner to collect and remove oil which flows through the oil fence liner.

The above descriptions are only exemplary descriptions of the technical spirit of the present invention, and those skilled in the art may variously change and modify the present invention without departing from the essential characteristics of the present invention. Accordingly, the drawings disclosed in the present invention are provided to not limit but describe the technical spirit of the present invention, and the scope of the technical spirit of the present invention is not limited by the drawings. The scope of the present invention should be interpreted by the following claims, and all equivalents should be included in the scope of the present invention.

What is claimed is:

1. An electric grill having an oil mist and smoke purification and circulation system, the electric gill comprising:
a grill main body;
an oil pan installed at one inner side of a lower portion of the grill main body to be slidable and in which water is stored;
a suction fan provided at one side of the oil pan and configured to suction air including oil mist, smoke, heat, and a smell to blow the air to the water stored in the oil pan;
a heat dissipation plate spaced apart in an upward direction from the oil pan and the suction fan to be coupled, spaced apart from inner side wall portions of both sides of the grill main body to be coupled to the inner side wall portions, and provided with a plurality of suction holes and discharge holes formed in upper portions of both side ends of an upper portion of a periphery of a grill plate in a longitudinal direction at intervals;
a heater support installed to be spaced apart from an upper portion of the heat dissipation plate;
a heater seated on the heater support; and
the grill plate in which a seating groove of the heater is formed in a lower portion thereof, and a side cross-sectional surface has a V shape to be seated on the heater,
wherein a detachable filter cartridge coupled in a longitudinal direction is installed in a space formed by the heat dissipation plate and both inner side wall portions of the grill main body which are spaced apart from each other, to additionally remove the oil mist, smoke, heat, and smell of the air which are circulated,
an oil fence spaced apart from a right side of the suction fan in an upward direction to be coupled and coupled to a right inner side wall portion of the grill main body is provided between the suction fan and the right inner side wall portion of the grill main body to prevent pollution of the right inner side wall portion of the grill main body from oil generated as the oil mist in the air which passes through the plurality of suction holes is condensed,
the oil fence includes: an oil fence liner coupled in close contact with the right inner side wall portion of the grill main body; and an oil pooling part formed in an U-shaped cross-sectional shape in a direction toward the suction fan from a lower portion of the oil fence liner to collect and remove oil which flows through the oil fence liner, and a Coanda air guide configured to guide the air including the oil mist, smoke, heat, and smell, which are suctioned, so that the air comes into contact with the water stored in the oil pan is installed between the oil pan and the suction fan, and the Coanda air guide includes a guide main body part, a Coanda curve part, and a Coanda nozzle so that the air including the oil mist, smoke, heat, and smell blown by the suction fan flows in a downward direction to the water stored in the oil pan through the Coanda nozzle due to a Coanda effect and thus the contact between the air and the water increases.

2. The electric grill of claim 1, wherein first oil discharge ports are formed in the grill plate along a central-longitudinal direction at a predetermined interval to protrude from and pass through a lower portion of the grill plate, and second oil discharge ports are formed in the heat dissipation plate along a central-longitudinal direction at a predetermined interval to protrude from and pass through an upper portion of the heat dissipation plate so that the first oil discharge ports are correspondingly inserted thereinto, and thus the oil is discharged through the first oil discharge ports and the second oil discharge port, thereby preventing pollution of the heat dissipation plate due to the oil.

3. The electric grill of claim 1, wherein:

the air suctioned by the suction fan is circulated in one direction through the plurality of suction holes of the heat dissipation plate and the space formed by the heat dissipation plate and both inner side wall portions of the grill main body which are spaced apart from each other; and the air including the oil mist, smoke, heat, and smell generated on the grill plate is suctioned by the suction fan and introduced through the plurality of suction holes at one side of the heat dissipation plate and the space formed by one side of the heat dissipation plate and inner side wall portions at one side of the grill main body which are spaced apart from each other, and comes into contact with the water stored in the oil pan to remove the oil mist, smoke, heat, and smell, and then is circulated through a space formed by the other side of the heat dissipation plate and an inner side wall portion at the other side of the grill main body which are spaced apart from each other and a plurality of discharge holes at the other side of the heat dissipation plate.

4. The electric grill of claim 1, wherein the Coanda air guide and the suction fan are configured to be insertable and separable at an upper end of the electric grill to be replaceable in a case of washing, a breakdown, or wear after being used.

* * * * *